(12) United States Patent
McCrossin et al.

(10) Patent No.: US 7,860,758 B2
(45) Date of Patent: Dec. 28, 2010

(54) METHOD AND SYSTEM FOR PROVIDING LOCAL INFORMATION OVER A NETWORK

(75) Inventors: James McCrossin, San Jose, CA (US); Dean Hiller, Shrub Oak, NY (US); Richard Kornutik, Westport, CT (US)

(73) Assignee: First Aura, LLC, San Jose, CA (US)

( * ) Notice: Subject to any disclaimer, the term of this patent is extended or adjusted under 35 U.S.C. 154(b) by 318 days.

(21) Appl. No.: 12/222,270

(22) Filed: Aug. 6, 2008

(65) Prior Publication Data
US 2009/0037282 A1    Feb. 5, 2009

Related U.S. Application Data

(62) Division of application No. 09/443,038, filed on Nov. 18, 1999, now Pat. No. 7,418,402.

(51) Int. Cl.
*G06Q 30/00* (2006.01)
(52) U.S. Cl. .................. 705/26; 705/4; 705/1.1
(58) Field of Classification Search .................. 705/26, 705/1, 27, 14.1, 41; 709/217, 227, 218, 200
See application file for complete search history.

(56) References Cited

U.S. PATENT DOCUMENTS

| | | | |
|---|---|---|---|
| 4,870,576 A | 9/1989 | Tornetta | |
| 5,032,989 A | 7/1991 | Tornetta | |
| 5,862,220 A | 1/1999 | Perlman | |
| 5,862,339 A | 1/1999 | Bonnaure et al. | |
| 5,944,787 A | 8/1999 | Zoken | |
| 6,026,368 A | 2/2000 | Brown et al. | |
| 6,052,730 A * | 4/2000 | Felciano et al. | 709/225 |
| 6,102,406 A * | 8/2000 | Miles et al. | 273/430 |

FOREIGN PATENT DOCUMENTS

| | | |
|---|---|---|
| WO | WO 97/47106 | 12/1997 |
| WO | WO 98/04088 | 1/1998 |

(Continued)

OTHER PUBLICATIONS

Anonymous "A Mapping Service for All Nations" Oct 4 , 1996 Information & Interactive Services Report , v 17 , n. 35 , p. N/A.*

(Continued)

*Primary Examiner*—Kelly Campen
(74) *Attorney, Agent, or Firm*—Kenyon & Kenyon LLP

(57) ABSTRACT

A method and system is provided where a first computer (e.g., a central server) collects information to be presented to one or more users. The information is organized into a plurality of first web-sites where each of these web-sites is addressable by a unique Universal Resource Locator (URL). A physical location is associated with each of the first web-sites. One of the first web-sites may be provided to a user as a user web-site. When the user or other individual seeks to access the user web-site, links to a plurality of the first web-sites are provided based on a relationship between the physical locations associated with the first web-sites and the physical location associated with the user web-site.

19 Claims, 5 Drawing Sheets

FOREIGN PATENT DOCUMENTS

WO     WO 99/46907     9/1999

OTHER PUBLICATIONS

Umar, Amjad "Inside Web app functioning. (Internet/Web/Online Service Information)" Sep 29, 1997 InformationWeek, n650, p1A(7).*

Ye, Xiaomin, *A Proposal for a Geographic-Based Address Structure for IPv6*, Masters Thesis, DalTech, Dalhousie University, Halifax, Nova Scotia, 1998.

*DataSite Offers Environmental Site Assessment Aid*, Information Today, vol. 13, No. 6, p20+, Jun. 1996.

* cited by examiner

FIG. 4

METHOD AND SYSTEM FOR PROVIDING LOCAL INFORMATION OVER A NETWORK

RELATED APPLICATIONS

This application is a division of U.S. patent application Ser. No. 09/443,038 filed on Nov. 18, 1999, U.S. Pat. No. 7,418, 402 B2.

FIELD OF THE INVENTION

The present invention pertains to a method and system for providing information to a user. More particularly, the present invention pertains to a method and system for providing information to a user based on a location of the user (e.g., the current location of the user).

BACKGROUND OF THE INVENTION

The number of users on the Internet and World Wide Web has grown tremendously in the last five years. As is known in the art, users typically access information that is residing on various computer systems coupled in the Internet system. For example, a user via a personal computer or network server is able to access information, such as a "web-page" from computers that are located throughout the world.

One problem associated with the Internet and World Wide Web is that the search for information tends to be geographically spread out. In other words, though the user may be searching for information on a local marketplace or event, he/she may be given information about marketplaces or events throughout a country or even the world. Accordingly, much of the information that is presented is probably not helpful to the user.

On the other hand, individuals and companies that seek to provide information, products, services, etc. to potential users/customers are often providing information globally to individuals who have no need for the information being provided. In view of the above, there is a need for a method and system that provides information to a user that is more tailored to the user's physical location.

SUMMARY OF THE INVENTION

According to an embodiment of the present invention, a method and system is provided where a first computer (e.g., a central server) collects information to be presented to one or more users. The information is organized into a plurality of first web-sites where each of these web-sites is addressable by a unique Universal Resource Locator (URL). A physical location is associated with each of the first web-sites. One of the first web-sites may be provided to a user as a user web-site. When the user or other individual seeks to access the user web-site, links to a plurality of the first web-sites are provided based on a relationship between the physical locations associated with the first web-sites and the physical location associated with the user web-site.

For example, the physical location of a telephone connection (e.g., the address to which a telephone number is assigned) may be the physical location of the first and user web-sites described above. Accordingly, the user web-site may be assigned a location related to the telephone number from which the user's computer system accesses the first computer system (e.g., over the Internet). The information provided to the user can thus be limited based on location so that only merchant information, events, news for a local area (e.g., linked to web-sites within a given distance from the location associated with the user's web-site) are presented to the user. According to a further embodiment of the present invention, monetary transactions can be based on when information is actually provided to the user. Thus, the merchant or other individual who seeks to provide information to the user is only charged when that information is provided to a user who is local to the merchant or to a user who is actually seeking more information from that merchant.

BRIEF DESCRIPTION OF THE DRAWINGS

FIG. 4 is a depiction of a merchant web-site presenting information for a user at his or her personal computer according to an embodiment of the present invention.

DETAILED DESCRIPTION

Figure 1:
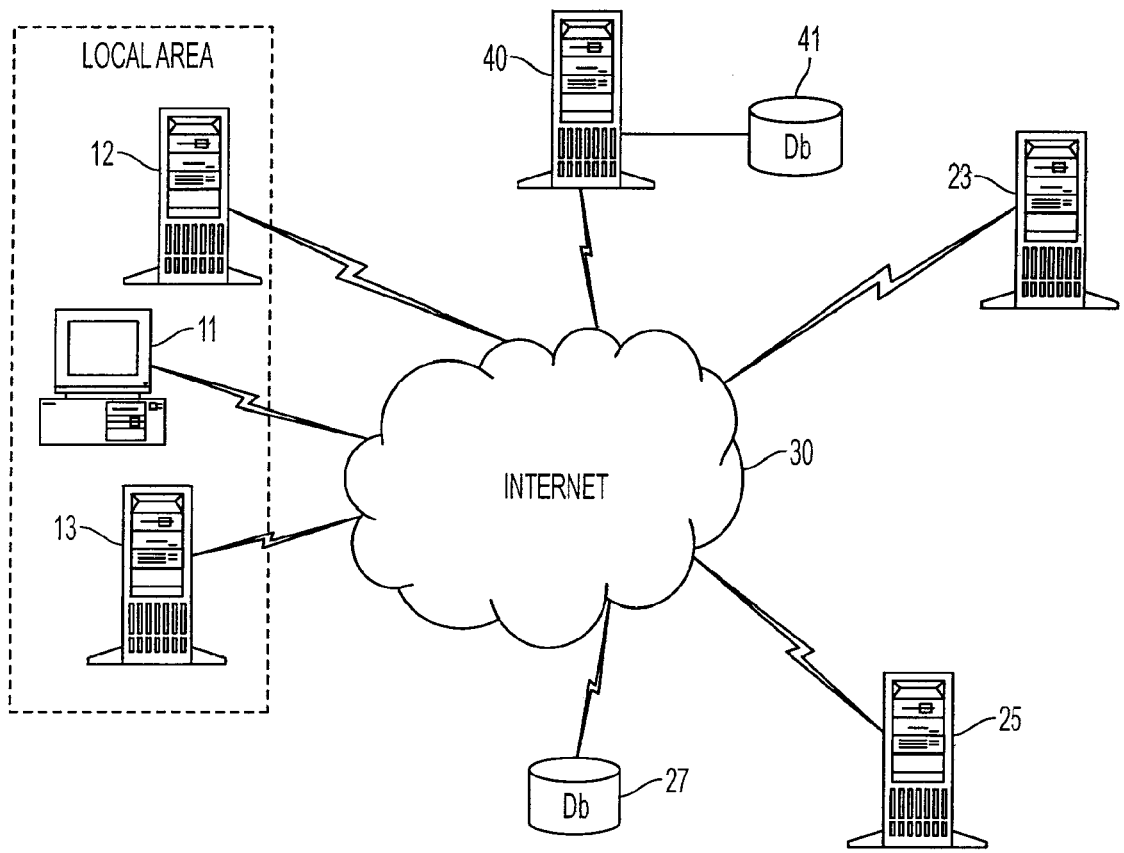
FIG. 1 is a block diagram of an Internet system employing an embodiment of the present invention.

Referring to FIG. 1, a simplified representation of a network system (e.g., the Internet system) as is known in the art is shown that may use embodiments of the present invention. In this example a user's computer system (e.g., personal computer 11) is coupled to the Internet 30 in a known manner (e.g., through a telephone connection to an Internet Service Provider (ISP)). A plurality of computer systems are coupled to the Internet 30 including servers 12, 13, 23, and 25. As is known in the art, the user (via computer 11) may be able to communicate with any of the other computers coupled to the Internet 30.

According to an embodiment of the present invention, each user's location may be identified based upon a telephone number. For example, the user's location can be identified based on the telephone number of the user's home or office. Also, the user's location can be identified based on the telephone number that is being used to access the Internet (e.g., when using a dial-in ISP such as America On-Line or the like).

Determining the appropriate telephone number to assign to a particular user can be performed during a registration operation. For example, the user may call a central server 40 using the telephone that is assigned the desired telephone number to identify the user. If the telephone number called is a toll-free number (e.g., a "1-800" number) in the United States, ANI (Automatic Number Identification) can provide the caller's phone number. Other caller-identification systems are available to identify the caller's telephone number. During such a telephone call, the user may be provided with a password. In this embodiment, a Universal Resource Locator (URL) for the user is reserved. For example, the user may be provided with a unique URL in the following form, for example:

http://www.abrainc.com/########## where ########## represents the ten-digit telephone number of the user (including area code). This URL provides an address to a user web-site, and a location is associated with this web-site (e.g., the longitudinal and latitudinal coordinates of the billing address for the user's ten-digit telephone number). One skilled in the art based on the above teaching will appreciate that other URL's may be used to uniquely identify the user and other indicia may be used to identify a location to be associated with a user's web-site.

Once a user has been assigned an appropriate URL, the user can then access that URL in a known manner. When the user first accesses this URL, the user is able to "claim" the URL as his or her own by providing the password provided during the initial telephone call. In this embodiment, accesses to the unique URL are directed to central server 40 (although it may be directed to other computer systems as desired as known in the art). Once a user logs in at the central server, the user may access information from the server identified to the user's URL. This "content" can be divided into two categories: Public pages and Private pages. Public pages include content that can be accessed by anyone accessing the user's unique URL. Private pages include content that is accessible only by the assigned user (which is assured during the login procedure) or by other individuals who have special access rights.

Once the user at computer 11 has registered with the central server 40, the location of the user is stored at the central server 40. This location can be determined based on the user's telephone number. In this example, data relating the location of a telephone number may be kept in a database local to the central server 40 (e.g., database 41) or may be accessible over the Internet (e.g., database 27). Once that data is known, a portion of information that is stored at the central server 40 may be provided to the user based on whether the individual or business that is providing the information is located within a "local area" 10 relative to the user. In this embodiment, web-sites for merchants, service providers, etc. have the same URL format as that identifying the user's web-site. The web-site content may be stored at the central server or at other locations. As with the user web-site these merchant web-sites each have a location associated with them (e.g., based on the ten-digit telephone number of the URL). Accordingly, when links to these pages are provided to the user, the central server 40 is able to select links (e.g., hypertext links according to the HTML 3.0 language) to those web-sites that are located within the local area 10 relative to the user.

A local area may be defined as a circle having a predetermined radius (e.g., twenty miles) centered on the physical location associated with the user's web-site (in this case the location of computer 11 accessing the Internet via a telephone connection). Thus, information provided by "local" individuals or businesses (i.e., where the location associated with their web-sites is local to computer 11 such as businesses located at servers 12 and 13) may be provided to the user while information provided by "non-local" individuals or businesses (i.e., where the location associated with their web-sites is not local to computer 11 such as businesses located at servers 23 and 25) is not. As indicated above, the web-sites discussed may be stored at central server 40, at individual servers 12, 13, 23, and 25, or elsewhere. The "local" nature of these web-sites depends on a physical location (e.g., a geographic coordinate location) associated with these web-sites.

Though a merchant may typically desire that its web-site be made available to as many user's web-sites as possible, it may be more practical for a merchant or the like to include its own local area. For example, a merchant whose business depends largely on delivery of merchandise may desire a local area that is limited to the delivery area of the merchant. Accordingly, links to the merchant web-site would only be provided to user's web-sites having an associated location within the merchant's local area.

In this example, the physical location of the user's web-site is based on a telephone number. In another embodiment, the physical location associated with a user's web-site may be determined based on the cell in which the user currently resides (e.g., in a cellular telephone system). Alternatively, a global positioning system (GPS) may be used to locate a user's web-site as is known in the art. In these examples, the physical location for the user's web-site needs to be provided to the central server 40, which can be handled by the cellular telephone system or entered directly by the user. Thus, a user may also enter any location as the user's physical location even if he or she is actually located elsewhere.

The central server system 40 stores data relating merchant information, news, events, etc. based on a location of such information. Once given the user's physical location, the central server system 40 can determine whether the location of such information is within a given radius of the user's location. Rather than defining the local area of the user based on a set radius from the user, the local area may be defined by political boundaries (e.g., municipalities or zip-code areas). Furthermore, the radius of the local area can be controlled based on population density. This would be achieved by first setting a threshold for a number of entities in a given local area (e.g., the number of telephone number connections). The radius of the local area can be increased until the number of telephone number connections in the local area meets the threshold. Other shapes for the local area may be used. For example, a square shape can be used as a latitudinal and longitudinal range centered around the user location. The content of the information that is accessible by the user may be driven by the user and/or the central server 40 as set forth in more detail below.

Figure 2A:
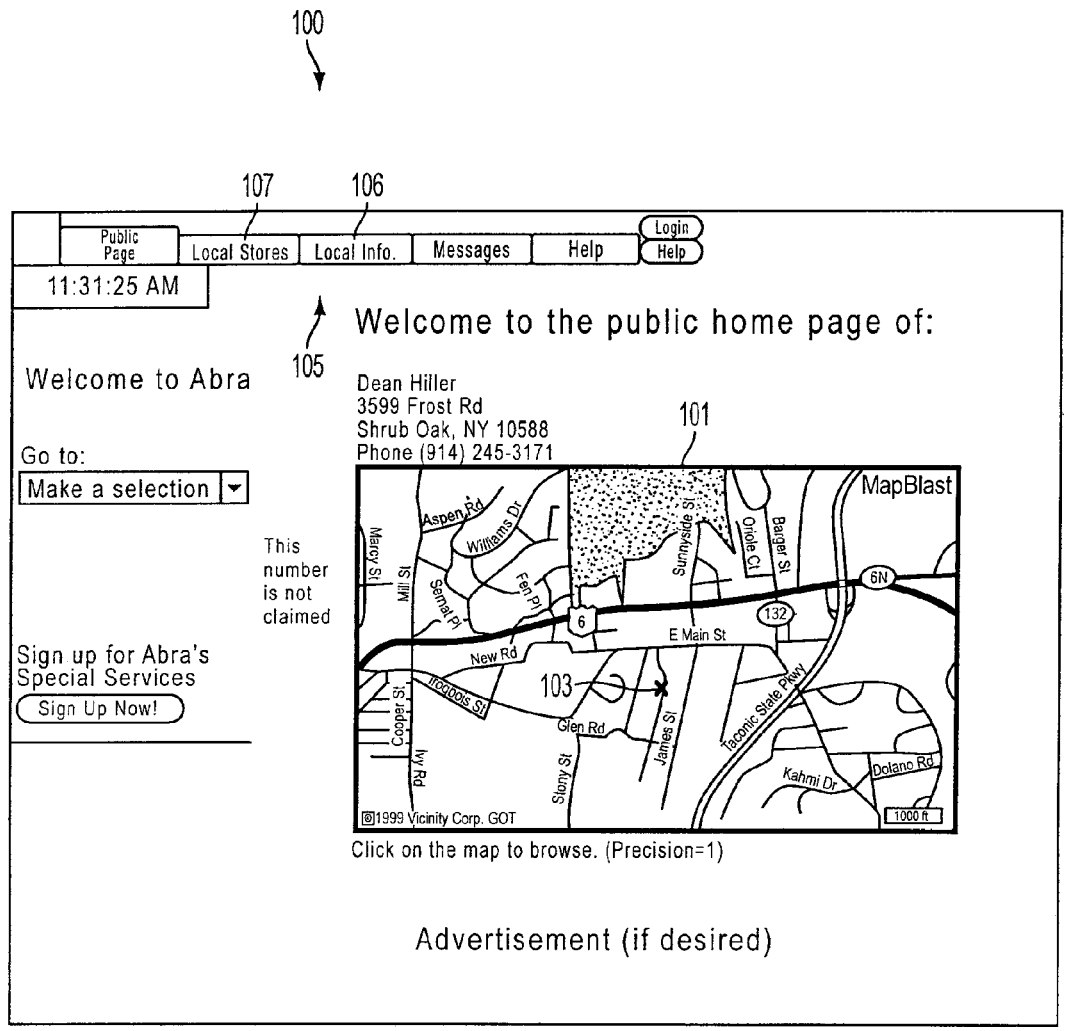
FIGS. 2a and b are depictions of a graphical user interface of public pages for a user at his or her personal computer constructed according to an embodiment of the present invention.
Figure 2B:
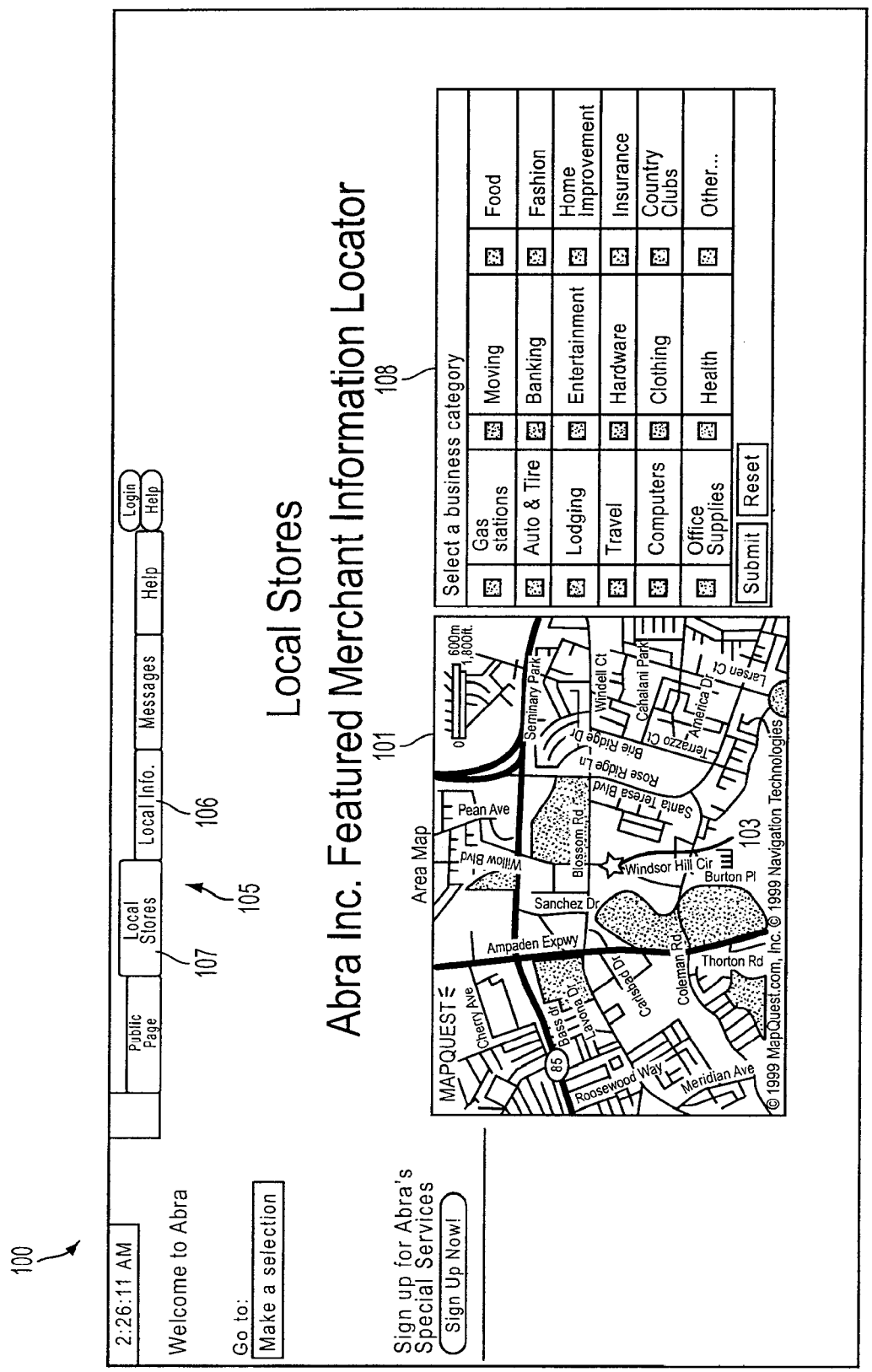

An example of a user's web-page is shown in FIG. 2a. The web-page includes a graphical user interface (GUI) that can be used to organize information accessible by the user. A user accesses this information when logging into the central server 40 (FIG. 1) as described above. In this example the GUI 100 provides a general map 101 (e.g., showing the location of the user at marker 103). Controls may be provided to allow the user to modify the scale and location of the map 101. Several tab areas 105 are provided which organize information for the user. For example, tab area 106 provides selectable information for news and/or events taking place locally to the user; and tab area 107 provides selectable information for merchants who are within the local area 10 (FIG. 1) of the user. Other tab areas may be provided to provide other information that is local to the user. Selection of tab area 107 reveals a selection area 108 (see FIG. 2b) of local merchant categories.

At least as a baseline of information, the links provided in the user's web-site are limited to web-sites for news, events and merchants that have an associated location that is within the local area 10 of the user's web-site. For example, "clicking" (i.e., inputting a selection via a mouse pointer device) on "Gas stations" in selection area 108 may reveal a list of gasoline stations with address and phone numbers in the local area of the user. In addition, the location of these gasoline stations may be displayed with markers and other identification information on map 101.

Figure 4:
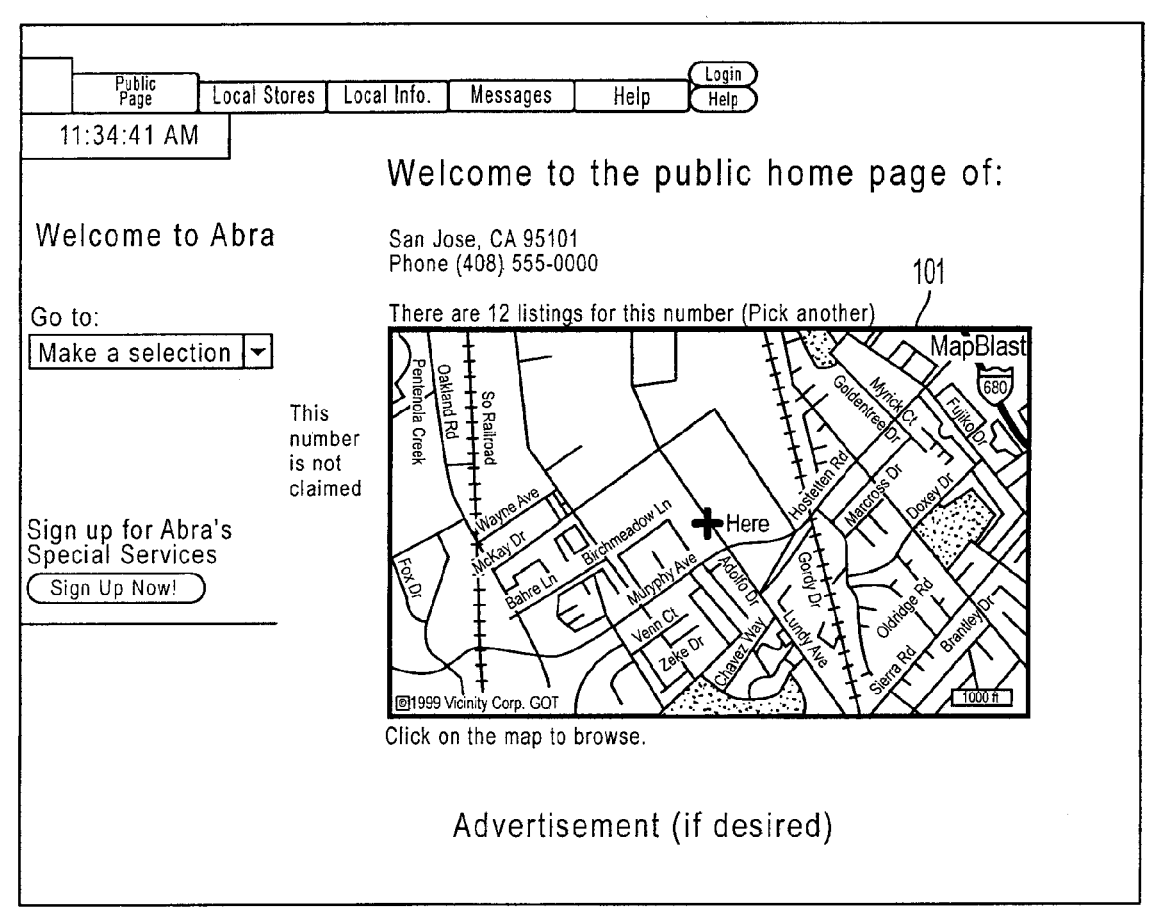

When the list of gasoline stations is presented, the user may select one of the gasoline stations on the list (i.e., a list of links to the web-sites for these gasoline stations). The user is presented with the information specific to the merchant, for example, by accessing an appropriate web-site via the link. An example of a web-site for a merchant is shown in FIG. 4. The merchant web-site may include some standard information such as address and operation hours along with promotional materials such as advertisements and coupons. The "local" merchant web-site may also include a hypertext link to a URL for a "global" merchant web-site or the like.

The user can add information to the user web-site. For example, the user may set up additional tab areas or subcategories within the tab areas. Again, the links that are collected for such additional tab areas or subcategories may be at a baseline level where the events, news, merchants, etc. for these web-sites located within the local area of the user. The user can also expand or contract the local area as desired or select other areas to be represented in the user's web-site. Since the user's web-site can be accessed by others accessing the URL described above, a second user located remotely to the user may be able to buy merchandise on behalf of or for the user based on the merchant links that are listed as local to the user. To that end, when a person accesses the central server 40, he or she may enter any of a variety of identification information which can be used to find the URL associated with that user. Examples include a user's telephone number (as discussed above), a user's home addresses, driver's license number, pilot's registration, etc.

Figure 3:
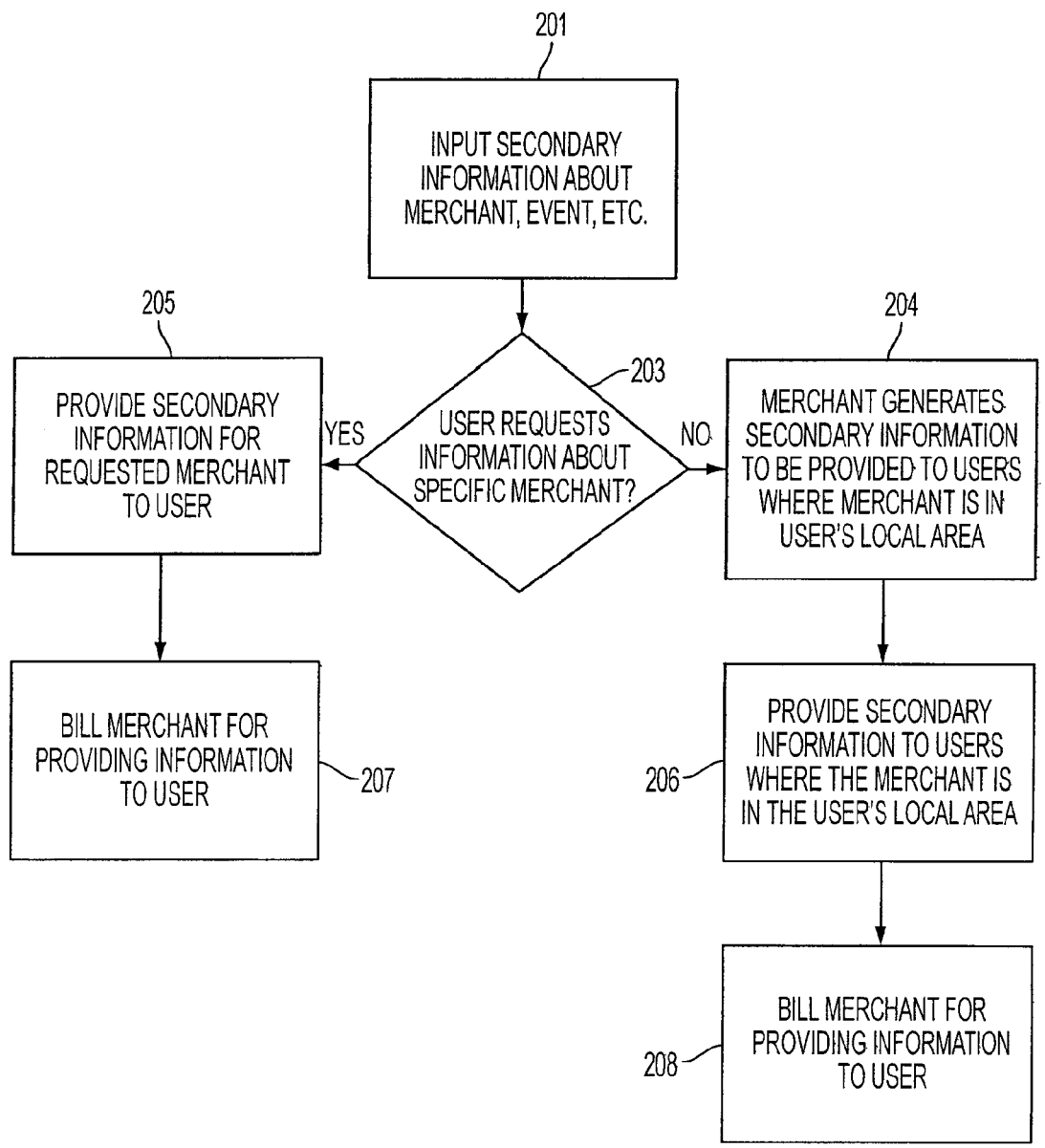
FIG. 3 is a flow diagram of an embodiment of a method according to an embodiment of the present invention.

According to an embodiment of the present invention, merchants and others seeking to advertise may direct that advertising to potential customers/users in a local area. A flowchart depicting a method for implementing such a transaction is shown in FIG. 3. In block 201, a merchant, for example, inputs (or has input) secondary information about the merchant such as the hours of operation, advertisements, promotional offers (e.g., coupons), etc. This information is then stored for each merchant at the central server 40 as a first web-site for the merchant. Such information can be stored as a web-site as shown in FIG. 4. The user, via the GUI shown in FIGS. 2a-b, may request more information from a merchant than is listed in his/her web-site. In decision block 203 it is determined (e.g., at the central server 40) whether such a request for information is made (e.g., selecting a link to the merchant's web-site). If such a request is made, then control passes to block 205 where the requested information is presented to the user in his/her web-site. In block 207, the merchant is then billed for the presentation of the secondary information to the user. In accordance with this embodiment of the present invention, the merchant is presenting marketing information to users whose local area includes the merchant. Thus, the merchant is better able to present marketing information to users that are nearby rather than by broadcasting advertising that goes to individuals who do not desire or cannot access the services or products provided by the merchant.

Alternatively, the merchant may seek to advertise to users that are local to it. In block 204, the merchant generates secondary information to be provided to users where the merchant is in the user's local area (e.g., in the form of a web-site stored at central server 40). In block 206, links to this secondary information (e.g., the web-site) are provided to all users who have the merchant represented in their Public page. In block 208, the merchant is billed for providing this information to local users.

When information on a merchant in a user's web-site changes, the user can be notified by flashing or modifying the tab used for selecting the merchant or the merchant name, itself. This gives the user the opportunity to access the information in his/her Public/Private pages. Further, when a merchant is part of a user's Public/Private page and the merchant has updated information for such users (e.g., a promotion, an advertisement, new operating hours, etc.), the merchant can make that information available at its web-site and the corresponding tab at the user's web-site can be made to indicate that new information from the merchant is available.

Although embodiments are specifically illustrated and described herein, it will be appreciated that modifications and variations of the present invention are covered by the above teachings and within the purview of the appended claims without departing from the spirit and intended scope of the invention. For example, though the Internet network is described above, the present invention has applications to other types of networks. Also, though the connection between a personal computer and the Internet is described as a telephone connection, other connections are known in the art such as cable/modem and digital subscriber line connections.

What is claimed is:

1. A method of performing a transaction comprising:
   collecting information at a first computer system from a merchant, said information being organized into a first web-site being addressable by a unique Universal Resource Locator (URL) and having a physical location associated therewith; and
   providing said information from said merchant to a user at a second computer system if said physical location is within a local area.

2. The method of claim 1 wherein said local area is a circular area having a predetermined radius from a predetermined physical location.

3. The method of claim 2 further comprising:
   billing said merchant when providing said information from the merchant to the second computer system.

4. The method of claim 1 wherein said local area is a political area including a predetermined physical location.

5. The method of claim 4 further comprising:
   billing said merchant when providing said information from the merchant to the second computer system.

6. The method of claim 1 wherein said local area is a zip-code area including a predetermined physical location.

7. The method of claim 6 further comprising:
   billing said merchant when providing said information from the merchant to the second computer system.

8. The method of claim 1 wherein said local area is a circular area having a radius from a predetermined physical location such that said circular area includes a threshold amount of entities.

9. The method of claim 8 further comprising:
   billing said merchant when providing said information from the merchant to the second computer system.

10. The method of claim 8 wherein said entities are telephone number locations.

11. The method of claim 10 further comprising:
    billing said merchant when providing said information from the merchant to the second computer system.

12. The method of claim 1 wherein said local area is a square area including the physical location associated with said user's web-site.

13. The method of claim 12 further comprising:
    billing said merchant when providing said information from the merchant to the second computer system.

14. The method of claim 1 wherein said local area is a predetermined radius from a physical location of said second computer system.

15. The method of claim 1 further comprising:
    specifying a predetermined physical location by said user; and
    determining said local area based on said predetermined physical location.

16. The method of claim 15 wherein said user specifies said predetermined physical location at a first time, the method further comprising:
    modifying said predetermined physical location by said user at a second time.

17. The method of claim 1 wherein said second computer is coupled to the Internet via a telephone connection and said local area is based on a location of said telephone connection.

18. The method of claim 17 further comprising:
    billing said merchant when providing said information from the merchant to the second computer system.

19. The method of claim 1 further comprising:
    billing said merchant when providing said information from the merchant to the second computer system.

* * * * *